(12) United States Patent
Zotz

(10) Patent No.: US 9,506,598 B1
(45) Date of Patent: Nov. 29, 2016

(54) MOUNTING SYSTEM TO DISPLAY AN OBJECT AND METHOD OF USE

(71) Applicant: April Zotz, Garland, TX (US)

(72) Inventor: April Zotz, Garland, TX (US)

(73) Assignee: April Zotz, Garland, TX (US)

( * ) Notice: Subject to any disclaimer, the term of this patent is extended or adjusted under 35 U.S.C. 154(b) by 0 days.

(21) Appl. No.: 15/001,593

(22) Filed: Jan. 20, 2016

Related U.S. Application Data

(60) Provisional application No. 62/186,428, filed on Jun. 30, 2015.

(51) Int. Cl.
| | | |
|---|---|---|
| *A47G 7/00* | (2006.01) | |
| *F16M 11/04* | (2006.01) | |
| *A47G 7/06* | (2006.01) | |
| *G09F 7/00* | (2006.01) | |
| *E04H 13/00* | (2006.01) | |

(52) U.S. Cl.
CPC ............ *F16M 11/04* (2013.01); *A47G 7/06* (2013.01); *E04H 13/003* (2013.01); *G09F 7/00* (2013.01)

(58) Field of Classification Search
CPC ...... E04H 13/003; F16M 11/04; A47G 7/06; A47G 25/00; A47G 25/10; A47G 7/04; A47G 7/041; G09F 7/00; A47F 7/06; A47F 7/0078; A47B 61/04

USPC .......... 248/27.8; 40/607.05–607.06, 607.09, 40/606.03, 124.5; 211/33, 85.23
See application file for complete search history.

(56) References Cited

U.S. PATENT DOCUMENTS

| | | | | |
|---|---|---|---|---|
| 4,894,937 A | * | 1/1990 | Davis | G09F 7/18 248/248 |
| 4,916,840 A | * | 4/1990 | Getz | G09F 7/20 40/605 |
| 5,083,390 A | * | 1/1992 | Edman | G09F 7/18 40/607.02 |
| 5,295,588 A | * | 3/1994 | Neirinckx | A47G 25/10 211/30 |

* cited by examiner

*Primary Examiner* — Christopher E Garft
(74) *Attorney, Agent, or Firm* — Eldredge Law Firm; Richard Eldredge

(57) ABSTRACT

A support system includes a stand having a first vertical member and a second adjacent vertical member; a first horizontal member and a second adjacent horizontal member; a first pole and a second pole extending from the second horizontal member; a first leg and a second leg extending from the first vertical member and the second vertical member; a first hook and a second hook extending from the second horizontal member; a sign removably attached to the first hook and the second hook; and an object, having a body; a first locking member configured to extend within the body and configured to engage with the first pole; and a second locking member configured to extend within the body and configured to engage with the second pole.

2 Claims, 3 Drawing Sheets

MOUNTING SYSTEM TO DISPLAY AN OBJECT AND METHOD OF USE

BACKGROUND

1. Field of the Invention

The present invention relates generally to mounting systems for displaying objects at a height relative to the ground surface, and more specifically, to displaying objects at cemeteries and/or other locations.

2. Description of Related Art

Leaving flowers and/or other objects at a cemetery gravesite is well known in the art. As shown in FIG. 1, a conventional gravesite 101 is shown having a tombstone 103 that sits upright relative to a ground surface 107. As depicted, it is commonly known to place a vase of flowers 105 proximate to the tombstone 103 in respect and remembrance for the deceased.

A problem commonly associated with gravesite 101 is that the vase of flowers 105 can be knocked over and/or the limited location wherein the vase can be placed. Further, although a vase of flowers is typically used, other items may be left at the gravesite without means to display or place the items thereabout.

Although great strides have been made in displaying objects at cemeteries, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
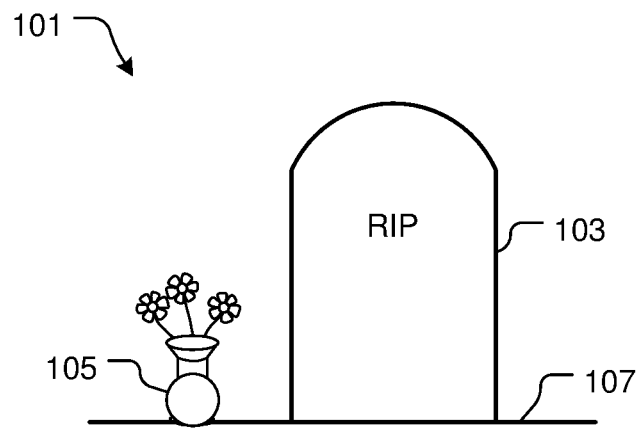
FIG. 1 is a front view of a conventional cemetery gravesite.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods to display and secure objects at height relative to the ground surface at a cemetery. Specifically, the system and method of the present application provides effective means to mount and display objects left nearby a grave. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
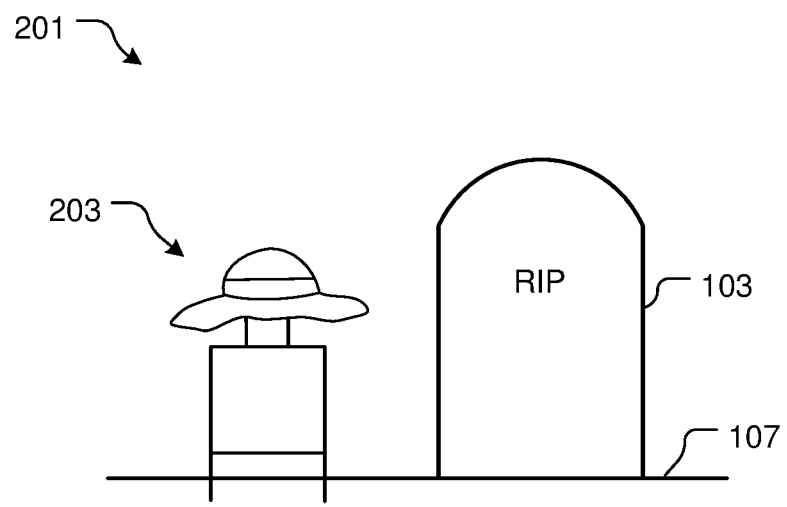
FIG. 2 is a front view of a support system in accordance with a preferred embodiment of the present technology.

Referring now to the drawings wherein like reference characters identify corresponding or similar elements throughout the several views, FIG. 2 depicts a front view of a gravesite 201 that utilizes the support system 203 in accordance with a preferred embodiment of the present application. As shown, the system 203 provides effective means to elevate an object relative to the ground surface 107 for display. In the exemplary embodiment, the system 203 is used with displaying and holding an object at a height relative to the ground surface at a cemetery; however, it will be appreciated that the features discussed herein could be used in locations such as a front lawn of a home and/or other locations.

Figure 3:
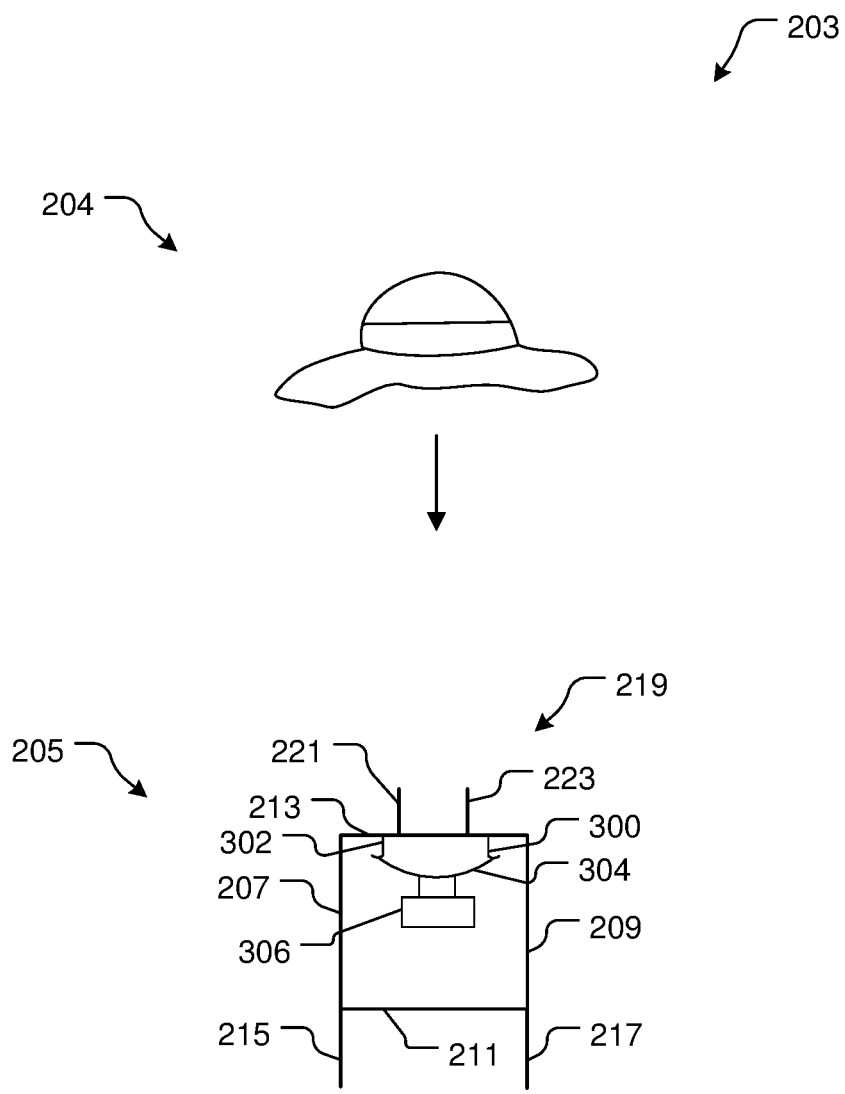
FIG. 3 is a detailed front view of the support system of FIG. 2.

In FIG. 3, an exploded front view of system 203 is shown. In the contemplated embodiment, system 203 comprises of an object 204 and a stand 205. During use, the stand 205 engage with the object 204 and secures the object 204 in a fixed position relative to the ground surface 107. Accordingly, the stand 205 provides an effective means to place objects near the tombstone, thereby overcoming the need to place the object on the ground surface as is common in the art. This feature allows the user to display a myriad of different types of objects, and in the preferred embodiment, the object 204 is a hat.

In the contemplated embodiment, stand 205 includes one or more of two horizontal members 211 and 213 that extend relative parallel to each other and are rigidly attached to two vertical members 207 and 209. One of the unique features believed characteristic of stand 205 is that the vertical poles 215 and 217 lift the system from the ground, protecting objects from destructive elements and other factors.

Stand 205 is further provided with two legs 215, 217 extending from respective vertical members 207, 209. In the contemplated embodiment, legs 215, 217 are integrally attached to members 207, 209 and have pointed ends to facilitate easy and rapid means to secure the stand in the ground surface.

Figure 4:
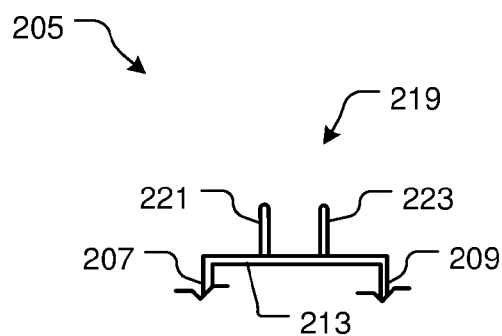
FIG. 4 is a partial front view of an attachment system of a stand of the support system of FIG. 3.

As shown in FIGS. 3 and 4, stand 205 is provided with an attachment means 219 configured to engage with object 204. In the contemplated embodiment, attachment means 219 are two poles 221, 223 rigidly attached to member 213 and configured to extend upright therefrom to engage with object 204. Although contemplated having two poles, it will be appreciate that alternative attachment means are also contemplated, for example, snaps, clips, hook-loop, and other quick-release device in an alternative embodiment. It is also contemplated that poles 221 and 223 can be placed at various locations on stand 205. Further, it will be appreciated that alternative embodiments could include a plurality of attachment means in lieu of the contemplated embodiment.

In one embodiment, it is also contemplated having two fastening means, e.g., two hooks 300, 302 extending from member 213 and configured to hold a chain 304 secured to a sign 306 for display.

Figure 5:
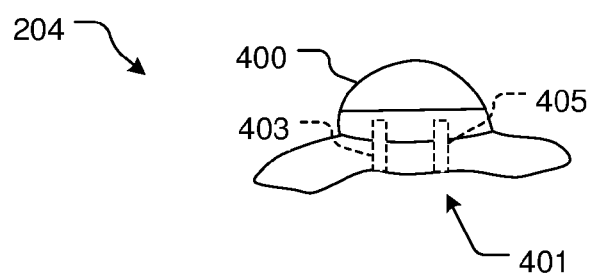
FIG. 5 is a front view of an object configured to engage with the stand of FIG. 3.

In FIG. 5, object 204 is shown having a body 400 with two receiving locking members 403, 405 configured to engage with respective poles 221, 223 of attachment means 219. In the contemplated embodiment, the locking members 403, 405 are holes the extend partially through the thickness of the body 400; however, it will be appreciate that other embodiment could include additional fastening means to secure the poles in position.

Figure 6:
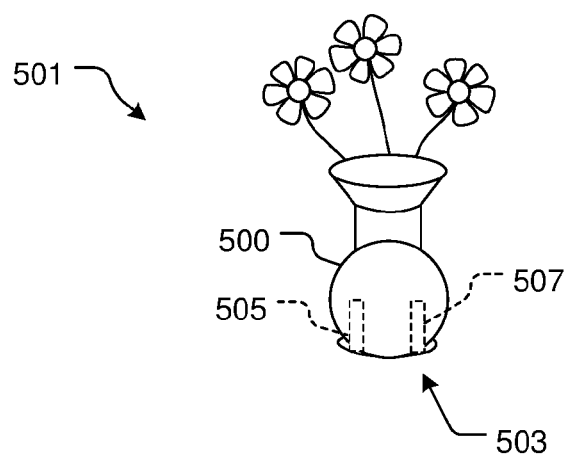
FIG. 6 is a front view of an object in accordance with an alternative embodiment of the present application.

It should be appreciated that alternative embodiments of object 204 are contemplated. For example, FIG. 6 illustrates a front view of a vase 501 having a body 500 and two locking members 505, 507 extending partially through the body 500 and configured to engage with poles 221, 223 in a similar fashion as object 204. Accordingly, the stand 205 could be adapted to engage with different types of objects with the attachment means. This features allows the user to interchange between objects, for example, a birthday object, ornamental object, seasonal object, and the like in accordance with a desired choice.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A support system, comprising:
    a stand having:
        a first vertical member and a second adjacent vertical member;
        a first horizontal member and a second adjacent horizontal member;
        a first pole and a second pole extending from the second horizontal member;
        a first leg and a second leg extending from the first vertical member and the second vertical member, respectively;
        a first hook and a second hook extending from the second horizontal member;
        a sign removably attached to the first hook and the second hook; and
    an object, having:
        a body;
        a first locking member configured to extend within the body and configured to engage with the first pole; and
        a second locking member configured to extend within the body and configured to engage with the second pole;
        wherein the object is removably attached to the stand; and
        wherein the object is a vase.

2. A method, comprising:
    providing the system of claim 1;
    supporting the vase at a height relative to a ground surface with the stand; and
    displaying a message with the sign.

\* \* \* \* \*